United States Patent [19]

McNeill

[11] 3,941,079

[45] Mar. 2, 1976

[54] EMERGENCY LOCATING DEVICE

[76] Inventor: John McNeill, Apartment 10, 210 S. Catalina, Pasadena, Calif. 91106

[22] Filed: Nov. 18, 1974

[21] Appl. No.: 524,712

[52] U.S. Cl. .......................... 116/124 B; 116/DIG. 9
[51] Int. Cl.² .......................................... B64B 1/50
[58] Field of Search ...... 116/124 B, DIG. 8, DIG. 9; 46/90, 88, 87; 343/706; 9/9

[56] References Cited
UNITED STATES PATENTS

| | | | |
|---|---|---|---|
| 2,862,531 | 12/1958 | Walker | 116/124 B |
| 2,923,917 | 2/1960 | McPherson | 116/124 B |
| 3,310,024 | 3/1967 | McConnell | 46/90 |
| 3,727,229 | 4/1973 | Clinger | 343/706 |
| 3,768,501 | 10/1973 | Elson | 46/90 |

Primary Examiner—S. Clement Swisher
Assistant Examiner—Denis E. Corr
Attorney, Agent, or Firm—Francis X. Lo Jacono

[57] ABSTRACT

A visual locating device for use as an aid in finding lost persons, wherein the device comprises a high-pressure cylinder having a lighter-than-air gas stored therein, and a valve means to control the flow of gas therefrom and into an inflatable balloon. Attached to the balloon is a second valve means wherein a portion of the gas cylinder is operably engaged therein to allow gas to flow into the balloon for inflation — and, conversely, preventing gas once contained therein from flowing out of the balloon when released. A rotatable cylindrical reel is operably attached and supported by the gas cylinder, the reel forming a spool having a tether line disposed thereon and attached to the balloon, thus allowing the balloon to ascend to the predetermined length of the line, the balloon having a prominent color so as to be easily located. A radar reflective means is also secured to the tether line.

5 Claims, 6 Drawing Figures

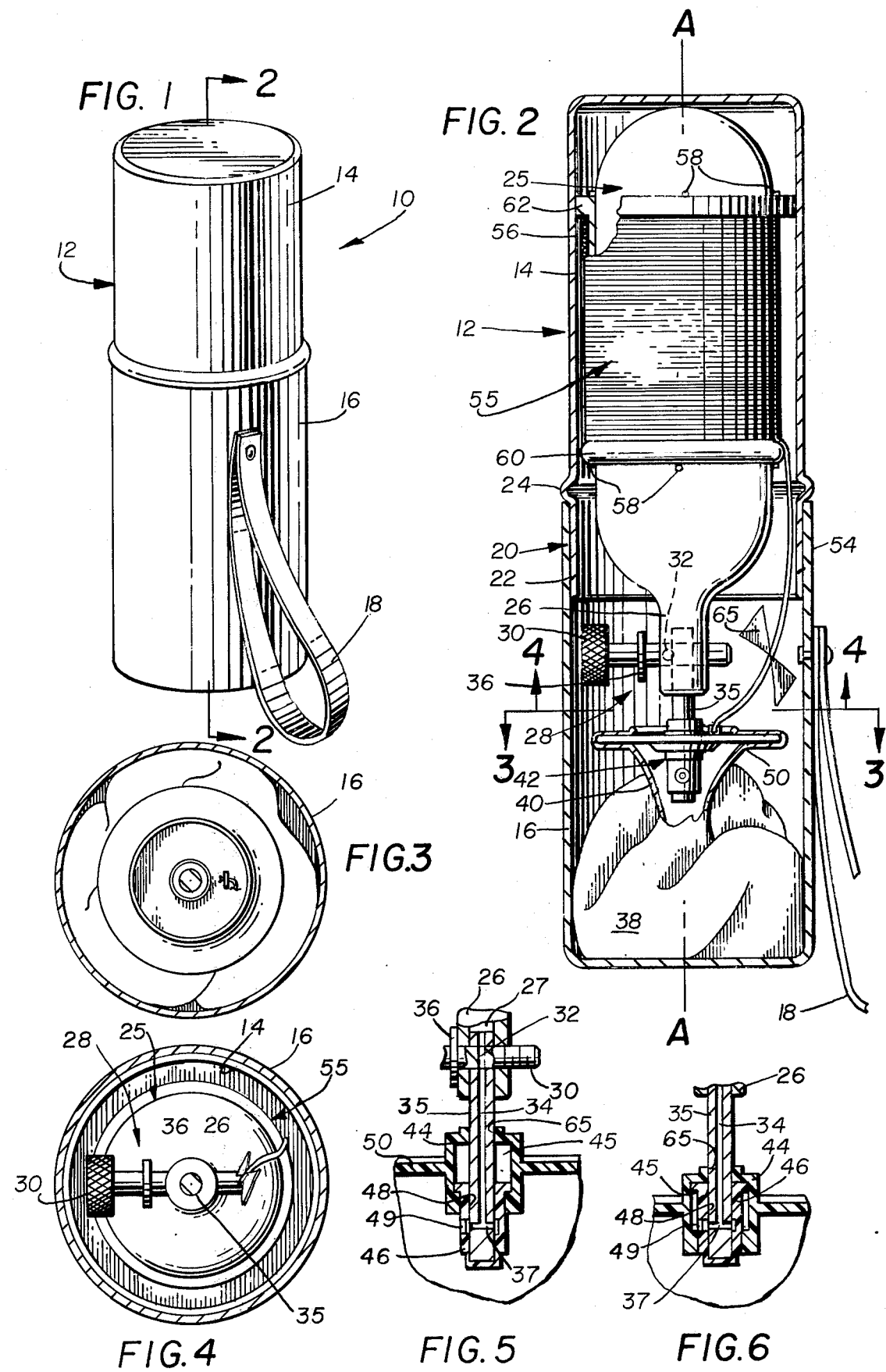

EMERGENCY LOCATING DEVICE

BACKGROUND

1. Field of the Invention

This invention relates generally to an emergency locating device, and more particularly to a locating device that is carried by an individual for use if or when he becomes lost or injured.

2. Description of the Prior Art

As is well known in the art, various types of locating devices are presently available. However, these devices are not designed to be carried on the person. Most locating devices have been designed to locate lost ships and downed aircraft.

Thus, there is a need to provide a locating device that can be readily carried by such persons as hikers, campers, fishermen, hunters, skiers, boaters, cyclists, motorists, as well as those pilots whose aircraft are not equipped with a locating device.

In the past, the use of an individual locating device carried on the person could have saved many lives. A small compact device such as the present could have aided searchers and rescue teams in spotting a lost or injured hiker, pilot, etc.

The applicant is not aware of any device that will aid search and rescue teams, law enforcement agencies, air-search units, para-medics, and any other groups, to more accurately locate lost, injured, or otherwise distressed persons in remote areas such as in the mountains, forests, the desert, or at sea.

SUMMARY

This invention provides an emergency locating device which can not only be visually monitored but, in some cases, by the use of radar. This device is so designed that each individual who feels the need for such a device can carry the locating unit with the hiking gear, camping equipment, etc. Thus, the lost or injured person may be readily located and rescued without undue loss of time.

This ease in locating distressed persons is made possible by the present invention which comprises a pressurized vessel formed as a pressure cylinder having a gas stored and disposed therein, the gas preferably being helium. The cylinder is adapted with a valve means at its open end which includes an extending valve stem.

Attached to the gas cylinder is an inflatable ballon which is provided with a self-closing valve means. This self-closing valve means is adapted to receive the valve stem of the gas cylinder. When the valve stem is received in the valve of the balloon, the valve is forced to a position allowing free flow of gas to enter the balloon from the cylinder, causing the balloon to inflate. As the valve stem is removed therefrom, the balloon valve closes; thus, the balloon is ready to be released.

Rotatably secured about the gas cylinder body is a reel formed by a spool having wound around it, in a suitable manner, a tether line, one end of which is attached to the balloon.

Accordingly, as the balloon is ready to be released, the unit is held horizontally so that the inflated balloon can ascend, causing the reel to rotate about the cylinder body, unwinding the tether line from the reel, the line having a length of approximately 500 to 600 feet. Hence, the balloon can be seen very readily, particularly if the balloon material is provided with a bright color or colors.

In addition, however, there also can be included a radar-reflecting means, such as a small piece of metal foil, which can reflect radar signals as well as sunlight.

Accordingly, the unit is stored in a two-piece housing, wherein one member of the housing is provided with a carrying means such as a strap. Hence, it can be readily seen that various types of carrying means will be easily adaptable to the housing.

OBJECTS AND ADVANTAGES

The present invention has for an important object a provision for a visual emergency locating device that is capable of being carried by campers, hikers, boaters, and the like, without excessive hindrance or burden to the individual.

It is another object of the invention to provide a self-contained, emergency locating unit which is simple in construction and easy to operate.

It is still another object of the invention to provide an emergency locating device that is relatively inexpensive.

A further object of the invention is to provide a device of this character that allows an injured or lost person to be readily found by means of a helium-filled balloon capable of ascending to heights up to 600 feet or more, whereby the balloon can be seen by rescuers.

It is a further object of the invention to provide a visual emergency locating device wherein the device includes a radar-reflecting means.

A still further object of the invention is to provide a device of this character that is rugged in construction and capable of having a relatively long working life.

Still a further object of the present invention is to provide a device of this character that is easy to service and maintain for continuous re-use.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a perspective view of the emergency locating device;

FIG. 2 is a cross-sectional view taken substantially along line 2—2 of FIG. 1, wherein portions thereof are illustrated in full lines;

FIG. 3 is a cross-sectional view taken substantially along line 3—3 of FIG. 2;

FIG. 4 is a cross-sectional view taken substantially along line 4—4 of FIG. 2;

FIG. 5 is an enlarged cross-sectional view of the valve means of the balloon in an open mode to receive the gas from the gas cylinder; and FIG. 6 is an enlarged cross-sectional view showing the balloon valve in a closed mode of operation just prior to the balloon being disengaged therefrom.

DESCRIPTION OF THE PREFERRED EMBODIMENT

Referring more particularly to the drawings, there is shown an emergency locating device, generally indicated at 10. As illustrated in FIG. 1, there is provided a container, indicated generally at 12, having an upper housing 14 and a lower housing 16, the lower housing being adapted with a carrying means shown as a looped strap 18. For illustrative purposes, the housing is shown as being force-fitted, such as indicated at 20. However, it should be understood that various coupling methods can be adapted. Thus, a simplified form is shown. Hence, housing 16 slides over the reduced-diameter free end 22 of housing 14 which, in turn, is provided with an annular bead 24 to limit the movement of housing 16.

Received and disposed within the housing 14 is a pressurized vessel means formed as a high-pressure cylinder, generally indicated at 25. This type of high-pressure cylinder is well known and operates very efficiently. The cylinder generally includes an extended reduced-diameter neck 26 having an outlet port 27, said neck being longer than usual, wherein a flow control valve means, indicated generally at 28, is disposed therein. Said valve means 28 comprises a valve pin 30 provided with threads to be threadably received through the neck 26.

Referring to FIGS. 2 and 5, the valve pin 30 includes a transverse passage 32 which is not aligned with cylinder axis A—A, as shown in FIG. 2. Hence, the valve is in an inoperative mode. As the valve is rotated inwardly, passage 32 is then aligned with passage 34 of the valve extension 35, at which time it is locked from further inward rotation by stop means 36, as seen in FIG. 5, thereby positioning the valve in an open mode of operation, which will be further described hereinafter.

Valve extension 35 is fixedly received within neck 26 and is provided with a free end having a transverse passage 37 communicating with the longitudinal passage 34 which, in turn, terminates within the gas chamber of the cylinder 25.

Accordingly, there is provided an inflatable buoyant means such as the balloon 38, which is seen in FIGS. 2 and 3 as being stored in housing 16. It should be noted that the balloon can be comprised of various non-porous materials such as rubber, plastic, or well known balloon fabrics.

Moreover, the above materials will be colored with a visually prominent color, such as the well known international orange.

The open end 40 of the balloon 38 is fixedly sealed with a self-closing valve means. Said valve means, as generally indicated at 42, comprises a main body 44, forming a chamber 45 (FIGS. 5 and 6) in which there is slidably received a valve piston 46. The valve piston extends through body 44, whereby the valve can be positioned with respect to either an open or closed mode of operation. Provided in the valve piston is a central bore 48 having the same diameter as that of the extension 35, in which said extension is received, said piston also including an outlet port 49. A detailed description will hereinafter be given.

Extending radially from the body 44 is a solid partition 50 which is that portion of the valve 42 that is secured to the balloon, as seen in FIG. 2. A tab 52 is integrally formed to the partition 50, to which the free end of a tether line 54 is attached.

Rotatably secured about the cylinder body 25 is a reel means, indicated generally at 55, comprising a spool 56 superposed over the cylinder 25; and disposed thereon is the tether line 54 which is also secured to the balloon 38. The spool is allowed to rotate about the cylinder body 25 but is held from longitudinal movement by mounting means represented by a plurality of outwardly-extending pins 58, these pins being fixedly secured to the cylinder. The spool 56 is provided with enlarged annular flanges 60 and 62, said flange 62 having a slightly larger diameter than flange 60, whereby the entire unit can be snugly received within the housing 14, while the balloon 38 is stored in the housing 16.

Hence, when the unit is stored in the container 12, the balloon is attached to the valve extension 35, as shown in FIG. 2. The flow-control valve means 28 is closed at this time; thus, no gas is allowed to flow from the cylinder. However, the self-closing valve means 42 has been forced open by the insertion of extension 35 through the valve opening 65. Said extension is then received in bore 48 and seats therein, causing the valve piston 46 to extend, as seen in FIG. 5.

Accordingly, when use of the device is required, the unit is removed from the container 12. The valve pin 30 is then rotated to the open position, as seen in FIG. 5. Passage 32 is aligned with passage 34 and the helium gas flows through the communicating transverse passage 37 which is aligned with outlet port 49 of the piston 46. Thus, the gas enters the balloon until it is full. At this time, the balloon is disengaged with extension 35, causing piston 46 to be retracted into chamber 45 whereby port 49 is enclosed therein, thus closing the valve and capturing the gas within the balloon 38.

Before releasing the balloon, the cylinder is placed in a horizontal position; that is, the axis A—A thereof is parallel to the ground and the balloon is then released to rise and become fully airborne, reaching an approximate height of 500 to 600 feet. After the balloon reaches its maximum altitude, the unit is moored so that the balloon is held in place with respect to the rescue area.

It is also contemplated that, in addition to the visual citing of the balloon, there may be times when radar equipment will be used. Thus, there can be added to the tether line a radar-reflecting means, shown in FIG. 2 as a metal foil 65.

The invention and its attendant advantages will be understood from the foregoing description; and it will be apparent that various changes may be made in the form, construction and arrangement of the parts of the invention without departing from the spirit and scope thereof, or sacrificing its material advantages, the arrangements hereinbefore described being merely by way of example; and I do not wish to be restricted to the specific forms shown or uses mentioned, except as defined in the accompanying claims.

I claim:

1. An emergency locating device comprising:
   a pressure cylinder including an extended neck member having an outlet port disposed therein;
   a lighter-than-air gas stored within said pressure cylinder;
   a flow-control valve attached to said neck member to control the flow of said gas stored in said cylinder, said flow-control valve comprises:
   a valve pin having a transverse passage positioned therethrough;
   a stop means mounted to said valve pin to effect an axial alignment between said transverse passage of said valve pin and said outlet port in said neck member;
   a valve extension member secured within said outlet port of said neck member and extending outwardly therefrom, said extension having a longitudinal passage communicating with said neck member outlet port, said extension having a transverse passage communicating with said longitudinal passage;

an inflatable buoyant means arranged to receive said lighter-than-air gas therein;

a self-closing valve means affixed to said inflatable buoyant means, self-closing valve means being removably attachable to said valve extension member, said valve means comprising:

a main body;

a chamber defined by said body; and a valve piston operably disposed in said chamber, and having a central bore to receive said valve extension therein, and an outlet port, whereby gas flowing through said valve extension is permitted to flow therefrom into said inflatable buoyant means;

a reel operably supported by said pressure cylinder for rotation therein wherein said reel includes a spool having opposite annular flanges, and wherein means for mounting said spool are included therein, said mounting means; comprising a plurality of outwardly-extending pins affixed to said cylinder adjacent said annular flanges thereof and wherein one of said flanges has a reduced diameter whereby said tether line can pass thereover when said buoyant means is released.

2. An emergency locating device as recited in claim 1, wherein said inflatable buoyant means comprises a balloon.

3. An emergency locating device as recited in claim 2, wherein said lighter-than-air gas is helium.

4. An emergency locating device as recited in claim 3, wherein said balloon is colored prominently for visual sighting.

5. An emergency locating device as recited in claim 2, wherein said device includes:

a storage container; and a carrying means attached to said container.

* * * * *